(12) United States Patent
Eatedali et al.

(10) Patent No.: US 10,269,158 B2
(45) Date of Patent: Apr. 23, 2019

(54) AUGMENTED OR VIRTUAL REALITY DIGITAL CONTENT REPRESENTATION AND INTERACTION

(71) Applicant: Disney Enterprises, Inc., Burbank, CA (US)

(72) Inventors: Josiah Eatedali, Burbank, CA (US); Benjamin F. Havey, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 67 days.

(21) Appl. No.: 15/356,289

(22) Filed: Nov. 18, 2016

(65) Prior Publication Data

US 2017/0345195 A1 Nov. 30, 2017

Related U.S. Application Data

(60) Provisional application No. 62/342,073, filed on May 26, 2016.

(51) Int. Cl.
| | |
|---|---|
| *G06T 11/60* | (2006.01) |
| *G06F 3/01* | (2006.01) |
| *G06F 21/62* | (2013.01) |
| *G06Q 20/12* | (2012.01) |

(52) U.S. Cl.
CPC ............. *G06T 11/60* (2013.01); *G06F 3/011* (2013.01); *G06F 21/6218* (2013.01); *G06Q 20/1235* (2013.01); *G06T 2200/24* (2013.01)

(58) Field of Classification Search
CPC ....... G02B 27/017; G06F 3/012; G06F 3/011; G06F 3/013

USPC ....................................................... 345/8, 633
See application file for complete search history.

(56) References Cited

U.S. PATENT DOCUMENTS

| | | | |
|---|---|---|---|
| 2009/0164287 A1* | 6/2009 | Kies ................... | G06Q 30/0277 705/1.1 |
| 2013/0042296 A1* | 2/2013 | Hastings ................. | G06F 21/10 726/1 |
| 2017/0173453 A1* | 6/2017 | Huang .................. | A63F 13/213 |
| 2017/0178260 A1* | 6/2017 | Wilde .................... | G06Q 50/14 |
| 2018/0088774 A1* | 3/2018 | Tsai ..................... | G06F 3/04815 |

OTHER PUBLICATIONS

[Road to VR. "Valve's Steam Virtual Reality Interface and Web Browser—SteamVR ." Road to VR, YouTube, Mar. 7, 2016, youtu.be/Sd2zO7UdzjY], (Year: 2016)*

(Continued)

*Primary Examiner* — Koosha Sharifi-Tafreshi
(74) *Attorney, Agent, or Firm* — Sheppard Mullin Richter & Hampton LLP

(57) ABSTRACT

Systems and methods for presenting augmented reality (AR) or virtual reality (VR) representations of digital content entitlements owned by a user are provided. An AR or VR environment is generated in which the AR or VR representations are presented to simulate a physical collection of media. The user is allowed to interact with the AR or VR representations, thereby triggering one or more actions, such as presentation of the corresponding digital content, presentation of additional, related content, presentation of an option to engage in a purchase transaction for related content or products, etc.

20 Claims, 9 Drawing Sheets

(56) References Cited

OTHER PUBLICATIONS

[Grubb, Jeffrey. "Buying Oculus Rift games through SteamVR", Jeffrey Grubb, YouTube, Mar. 28, 2016, https://youtu.be/uFs4wWjLaas] (Year: 2016).*

[James, Paul. "SteamVR 'Shell' Is Customizable, Allows Seamless VR Game Switching and Web Browsing." ROADTOVR, ROADTOVR, May 7, 2016, www.roadtovr.com/steamvr-shell-is-customizable-allows-seamless-vr-game-switching-and-web-browsing] (Year: 2016).*

[Carbotte, Kevin. "Beta SteamVR Interface Is Easy to Navigate, Offers Plenty of Customization "ROADTOVR, ROADTOVR, Mar. 8, 2016, http://www.tomshardware.com/news/steamvr-interface-customization-options,31350.html (Year: 2016).*

[Igravehead, "Netflix ui", YouTube, Dec. 4, 2013, youtu.be/cMeMsD5R6q8] (Year: 2013).*

* cited by examiner

AUGMENTED OR VIRTUAL REALITY DIGITAL CONTENT REPRESENTATION AND INTERACTION

CROSS-REFERENCE TO RELATED APPLICATIONS

This application claims the benefit of U.S. Provisional Application No. 62/342,073 filed on May 26, 2016 which is incorporated herein by reference in its entirety.

TECHNICAL FIELD

The present disclosure relates generally to augmented reality (AR)/virtual reality (VR) presentations.

DESCRIPTION OF THE RELATED ART

VR can refer to the creation of a fully immersive virtual world/space experience that users may interact with. AR can refer to the blending of VR elements and real life. For example, AR may involve providing a live displayed experience of a physical, real-world environment in which the real-world elements are augmented by computer-generated sensory input.

BRIEF SUMMARY OF THE DISCLOSURE

In accordance with one embodiment of the present disclosure, a computer-implemented method comprises presenting an augmented reality (AR) or virtual reality (VR) representation of one or more digital content entitlements. The computer-implemented method further comprises receiving interactive input regarding the AR or VR representation of the one or more digital content entitlements. Further still, the computer-implemented method comprises invoking one or more actions related to digital content associated with the one or more digital content entitlements based upon the interactive input.

In accordance with another embodiment, an apparatus, comprises a simulation device adapted to create an AR or VR representation for each digital content entitlement to digital content owned by a user. At least one sensor of the apparatus is adapted to at least one of receive and provide motion information associated with the user interacting with one or more of the AR or VR representations. The apparatus further comprises a presentation device adapted to present an AR or VR environment in which the AR or VR representations as a collection representative of the digital content owned by the user.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Ownership or licensing of digital content, such as downloadable or streamable digital movies, computer games, digital music, and electronic digital content files, lack the collectible nature of their traditional physical counterparts. Prior to digital content becoming so prevalent, collecting compact disc (CD) or vinyl music albums, digital video disc (DVD) movies, and the like was a pastime in of itself. Owners of content recorded on physical media could collect the physical media as well as display the physical media collection to others. However, these aspects/experiences associated with physical media are not easily replicated with digital content, nor is there an easy way to provide a digital "gift with purchase." Moreover, consumers of digital content currently favor subscription-based content rental services over digital content ownership, such as the purchase of electronic home video licenses (EHVLs).

Accordingly, various embodiments described herein leverage AR or VR technologies as a platform to provide a representation or user interaction experience with digital content. Use of AR or VR digital content representation or interaction in accordance with various embodiments can encourage higher margin digital ownership over lower margin rental transactions currently being used. Furthermore, AR or VR representation of and interaction with digital content can be leveraged to encourage content discovery and provide a mechanism for the aforementioned digital gift with purchase experience.

In particular, entitlements corresponding to digital media content such as movies, can be represented in an AR or VR experience, for example, with AR or VR representations of corresponding movie characters. These AR or VR representations can be collected and displayed in an AR or VR environment, and a user may interact with the AR or VR representations to, for example, initiate playback of the digital media content, initiate content discovery, receive gifts, and engage in purchase transactions of related content or products. In some embodiments, physical objects may be utilized in an AR experience to represent digital content entitlements, and with which users may interact to perform the aforementioned actions.

Figure 1:
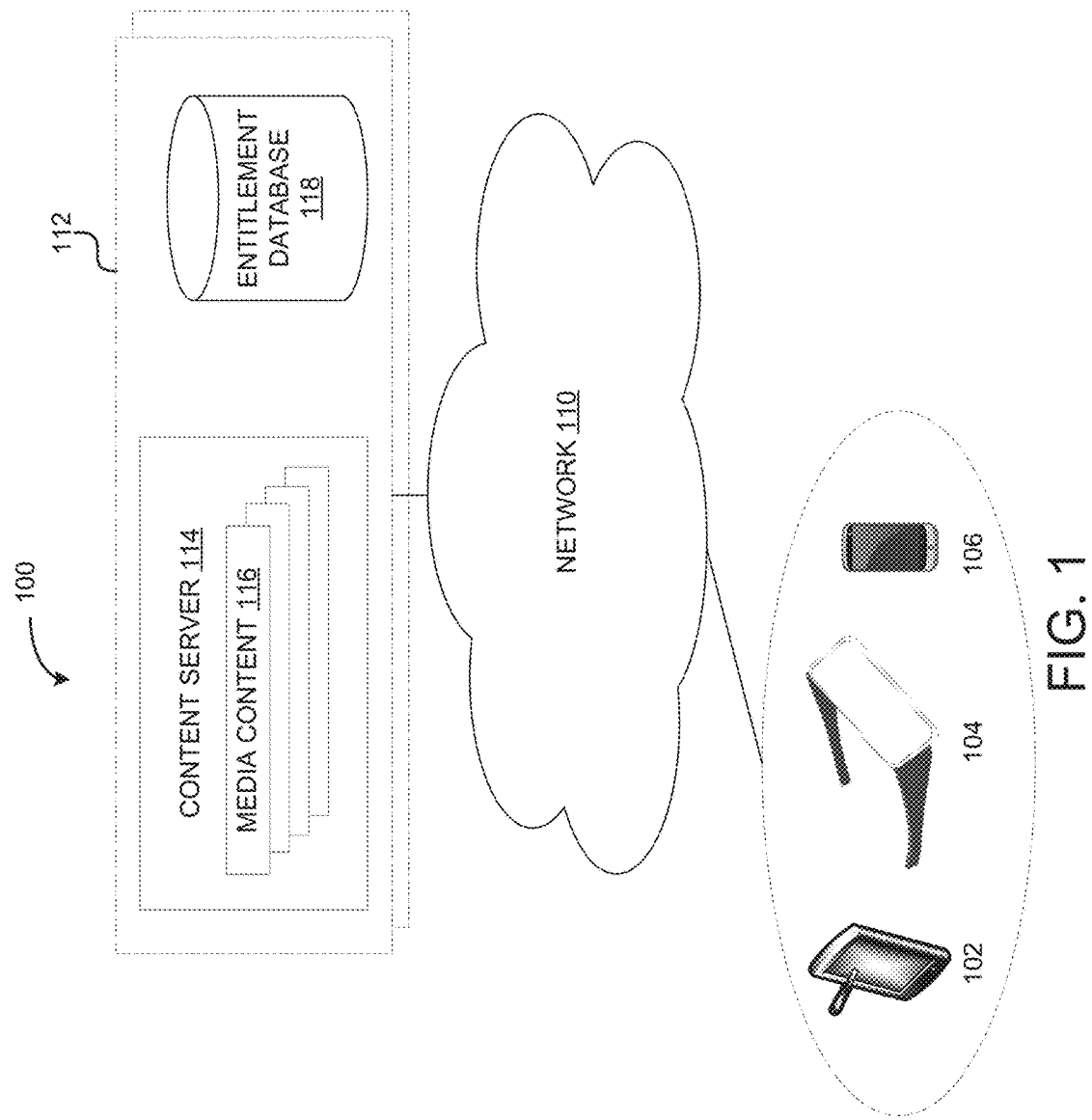
FIG. 1 is an example AR or VR digital content entitlement representation and interaction system in accordance with various embodiments.

FIG. 1 is a diagram illustrating an example system 100 in which various embodiments can be implemented, and will be described in conjunction with FIG. 2, which is a flow chart illustrating various operations performed in accordance with various embodiments for providing and interacting with AR or VR representations of digital content.

System 100 may include one or more user devices through which an AR or VR experience can be provided. For example, a user may utilize a tablet personal computer (PC) 102, a headmounted display device 104, or a smartphone 106 to engage in an AR or VR experience in accordance with various embodiments. It should be noted that other devices, such as laptop PCs, computing gaming systems or units, etc. may be used in accordance with other embodiments.

System 100 may further include one or more media content providers 112, which may be a broadcast entity, such as a television broadcast network entity (e.g., ABC), a cable provider (e.g., COMCAST®), or any other digital media content distributor, such as Amazon®, iTunes®, Netflix® or a production studio. Content provider 112 may include a content server 114 on which digital media content 116 can be stored, along with any required entitlements, other entitlement information (e.g. date and time of content acquisition), DRM licenses, etc. which can be maintained in entitlement database 118.

Network 110 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 110 may employ various communication media, such as a coaxial cable, fiber optic cable system, Ethernet, radio waves, etc. Further still, network 110 may be one or more combinations of any of the aforementioned networks.

Figure 2:
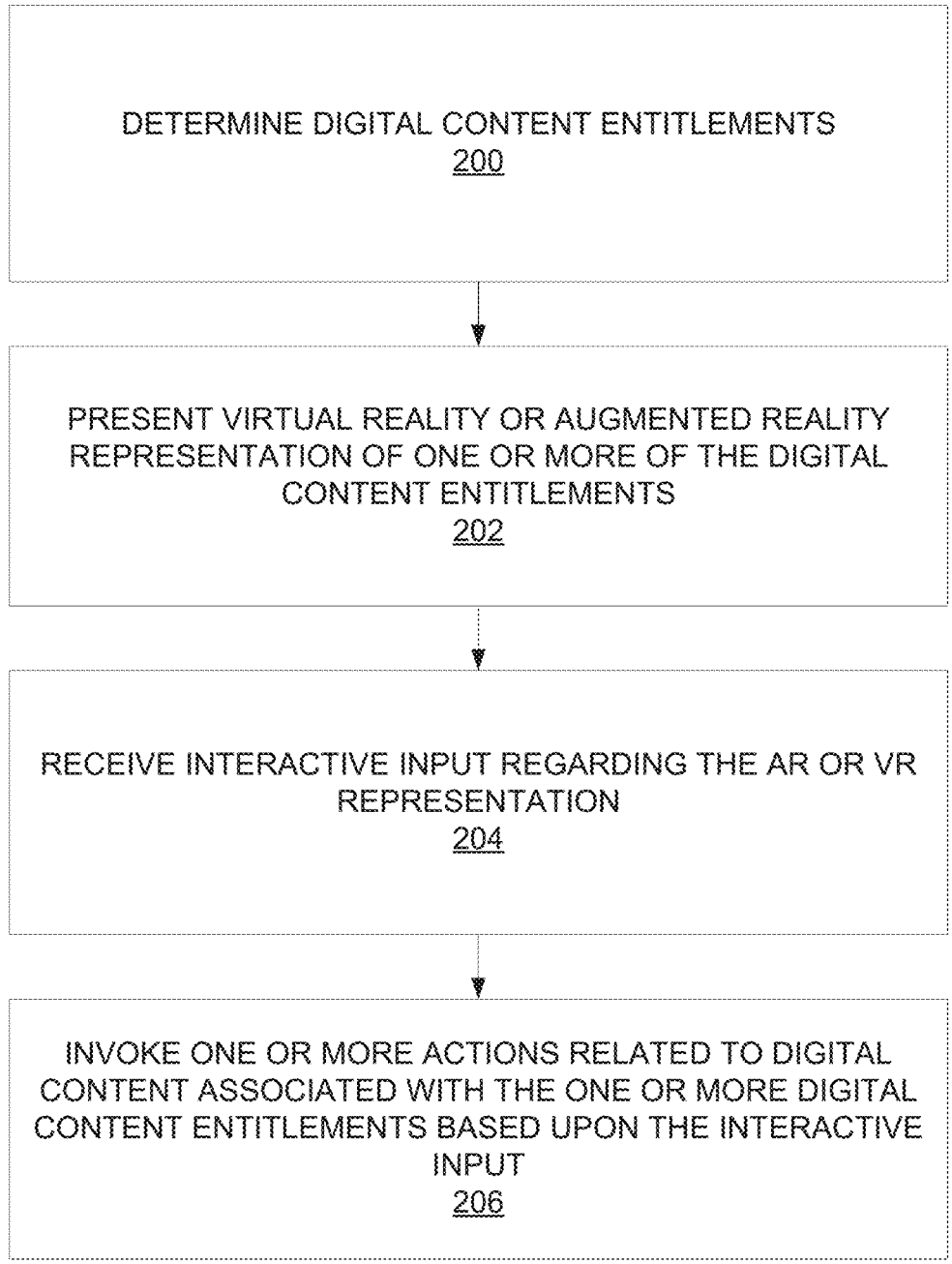
FIG. 2 is an operational flow diagram illustrating an example process for representing digital content entitlements with AR or VR representations and interacting with those representations in accordance with various embodiments.

Referring to FIG. 2, at operation 200, digital content entitlements are determined. That is, entitlements associated with a user's ownership or license of one or more digital media content 116 can be determined by content server 114, which may then inform an AR or VR system or device 300 (FIG. 3) running or implemented on a user device, e.g., user device 104. Alternatively, the AR or VR system 300 may directly determine any entitlements associated with the user by accessing content server 114 and/or entitlement database 118. Interaction with or use of the AR or VR system 300 may be effectuated through an AR or VR application which may be a standalone application associated with a content service provider such as content provider 112. Alternatively, the AR or VR application may be an aspect or feature of an existing application or service, such as an AR or VR computer game or a content service application with which the user is registered, allowing him/her to access his/her content anywhere the user can log into the content service application.

At operation 202, an AR or VR representation of one or more of the digital content entitlements is presented. The AR or VR representation may be a character from the digital content, an item from or relating to the digital content, word art of a title of the digital content, etc. The AR or VR representations may be cataloged and organized randomly, alphabetically, or by genre to make it easier for users to "physically explore" their digital libraries in the AR or VR environment. The user could physically navigate from an area of their collection associated with comedy and filled with light-hearted characters and bright colors to an area of their collection associated with horror that is filled with scary creatures and frightening animations.

It should be noted that a myriad of options for customizing the AR or VR environment are contemplated in accordance with various embodiments. For example, a default theme can be applied to the AR or VR environment based upon randomly selected digital content, a genre or characteristic common to the majority of the user's digital content, and so on. Themes may morph from one to another depending upon the AR or VR representation being interacted with or depending upon which AR or VR representation the user approaches, for example.

In some embodiments, the user's content consumption can be used as a basis for customizing the AR or VR environment. For example, instead of or in addition to considering the user's digital content entitlements, content server 114 and/or one or more of user devices 102, 104, and 106 may maintain data regarding the user's viewing history. The AR or VR environment can be customized such that it morphs in accordance with the user's viewing history. In some embodiments, customization of the AR or VR environment can change on a monthly basis, yearly basis, weekly basis, or based upon some other time period. That is, during a particular month, the AR or VR environment theme can be based upon the most-viewed content (e.g., most-watched series) that the user experiences in that month, which may then change to another theme based upon other content the user experiences in a following month. In some embodiments, an AR or VR representation of a timeline can be presented in the AR or VR environment that the user can "hold" and "manipulate." For example, the user may expand or compress the AR or VR representation of the timeline to see more or less detail regarding the user's viewing history. In some embodiments, the AR or VR representation of the timeline or certain visual aspects thereof can be utilized as decorations in the AR or VR environment, where an image(s) of a scene(s) of consumed content can be displayed in the AR or VR environment. In some embodiments, this can be used to expand AR or VR representation of the timeline and/or grow the decorations, whereas in some embodiments, the AR or VR representation of the time and/or the decorations can be updated/replaced with newer content representations.

At operation 204, interactive input is received regarding the AR or VR representation. That is, the user may physically interact with an AR or VR representation of a digital content entitlement in order to engage in the consumption of the digital content entitlement. For example, the user can play with, dance with, pick up, throw, converse with, or otherwise perform some interaction with an AR or VR representation in the AR or VR environment.

At operation 206, one or more actions related to digital content associated with the one or more digital content entitlements based upon the interactive input is invoked, such as playback of a movie. It should be noted that other actions are possible in accordance with other embodiments. For example, other actions may include engaging in a purchase transaction for related digital content, merchandise, and the like. It should be further noted as well, that different interactions with an AR or VR representation can be used to initiate different actions.

Figure 3:
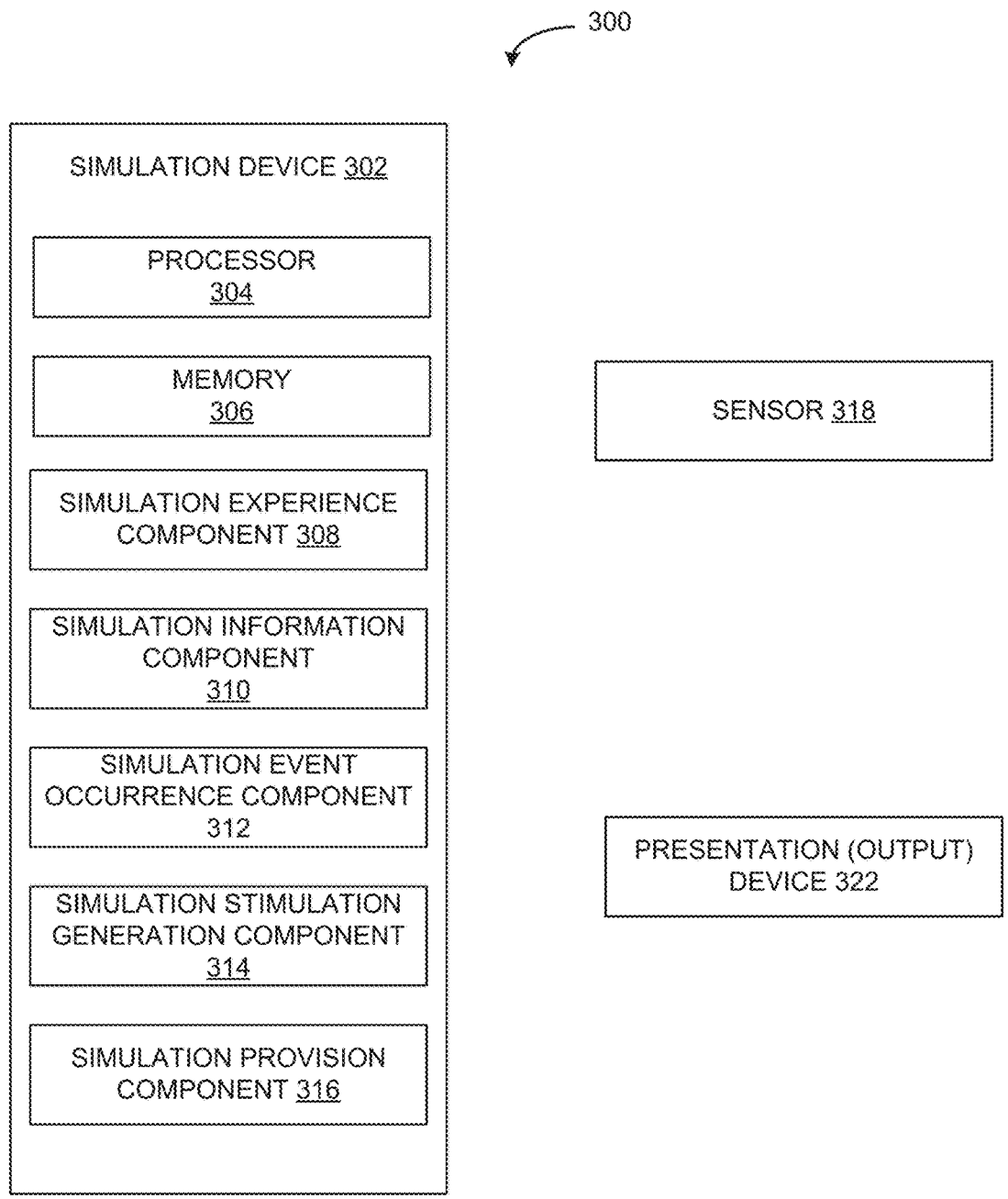
FIG. 3 is an example AR or VR device architecture in accordance with various embodiments.

Referring now to FIG. 3, an example representation of an AR or VR system or device 300 through which an AR or VR experience can be implemented is described. System 300 may include one or more of a simulation device 302, a sensor 318, and a presentation (output) device 322. Some or all components of system 300 may be installed in or implemented as part of a user device, such as one of user devices 102, 104 or 106 of FIG. 1, or another contemplated user device or system. Some or all components of system 300 may be worn or held by a person.

Presentation (output) device 322 may be configured to provide a simulation experience visually, audibly, haptically, and/or in other ways. Presentation device 322 may include one or more of a display, a speaker, a light source, and/or other simulation devices.

A display may provide a simulation experience through visual information presented on the display. Visual information may include information that may be observed visually, such as an image, video, and/or other visual information. Following the above example, such visual information may comprise one or more AR or VR representations of the user's digital content entitlements as well as an AR or VR environment in which the AR or VR representations are presented and/or interacted with. In one embodiment, a display may include one or more of an optical head-mounted display (see FIG. 1), a head-mounted display 104 in which simulation device 302 (or alternatively, presentation device 322) may be integrated, a see-through display, an optical see-through display, a video see-through display, a visor, eyeglasses, sunglasses, a computer, a laptop, a smartphone, a tablet, a mobile device, a projector, and/or other displays.

In some implementations, a display may include a motion, position, and/or orientation tracking component, so that the visual information presented on the display changes as the position and/or orientation of the display changes.

A display may be configured to display a simulation experience using AR or VR technology. For example, a display may visually provide the simulation experience by displaying an overlay image over one or more of an image, a video, and/or other visual information so that one or more parts of real-world objects appear to be augmented by one or more parts of virtual-world objects. Other systems and methods of providing a simulation experience are contemplated.

A speaker may provide a simulation experience through audio information generated by the speaker. Audio information may include information that may be observed audibly. Audio information may include one or more of sound, vibration and/or other audio information. A speaker may include one or more of a headphone, an earphone, a headset, an earset, and/or other speakers. In some implementations, a speaker may include a speaker associated with a display. For example, a speaker may include a speaker of a mobile device, such as a smartphone.

A light source may provide a simulation experience through one or more wavelengths and/or intensities of light. A light source may include an electric lighting, a fluorescent lighting, an incandescent lighting, an infrared lighting, a light-emitting diode, and/or other light sources. In some implementations, a light source may include a light source of a mobile device, such as a smartphone.

In order to present the AR or VR representations of digital content entitlements, digital content entitlement criterion relevant to the user is obtained, e.g., information or data indicative of the digital content entitlements that the user owns, and the AR or VR experience is adapted based upon the digital content entitlement criterion. To accomplish this, simulation device 302 may be configured to execute one or more computer program components. The computer program components may include one or more of a simulation experience component 308, a simulation information component 310, a simulation event occurrence component 312, a simulation stimuli generation component 314, a simulation provision component 316, and/or other components.

Simulation experience component 308 may be configured to select a simulated experience or overall theme predicated on displaying digital content entitlements, as previously described. It should be noted that a simulation experience may also be selected based upon a user selection, a prior simulated experience, and/or other information. Simulation experience component 308 may include or retrieve information, for example, from entitlement database 118 that matches one or more of digital content entitlements or characteristics thereof (such as genre, marketing franchise, common character(s), most viewed, etc.), a user selection, a prior simulated experience, and/or other information relating to a particular simulation experience.

Simulation Information component 310 may be configured to obtain simulation information for the simulation experience. The simulation information may include one or more of a database, a lookup table, and/or other information component that allows simulation information component 310 to match a simulation event to a simulation stimulus. A simulation event may refer to one or more of specific motions, specific actions, specific sounds, specific locations, specific surroundings, and/or other specific conditions relating to a user utilizing simulation device 302. A simulation stimulus may refer to one or more of a visual, an audio, a haptic and/or other simulation that may change a simulation experience. The simulation information may be programmed into simulation information component 310, updated by simulation information component 310, obtained by simulation information component 310 from electronic storage, obtained by simulation information component 310 from a remote location, and/or obtained by simulation information component 310 in other ways. For example, in the context of simulation experience component 308 presenting a super-hero themed collection of super-hero characters associated with a super-hero media content, a user throwing a super-hero's weapon can be used to provide haptic feedback likening the feeling of being hit by the weapon, which then can be used to initiate playback of the media content.

The simulation information may include simulation stimuli that correspond to simulation events. The simulation stimuli may include a first simulation stimulus that corresponds to a first simulation event. For example, a particular simulation stimulus (e.g., an AR or VR representation of a digital content entitlement being "high-fived") may correspond to a particular motion of the user's hand (e.g., moving towards the AR or VR representation in an outstretched position). Other simulation stimulus and simulation events are contemplated.

Simulation information component 310 may also be configured to obtain contextual information from the user's surroundings, for example, from output signals generated by sensor 318. In one embodiment, simulation information component 310 can obtain contextual information such as physical objects in the vicinity of the user which may be used as a virtual platform on or in which to present AR or VR representations of digital content entitlements. In another embodiment, simulation information component 310 can determine a location of the user, and based upon the location, can present customized subsets of the user's digital content entitlements. That is, if the user is determined to be in a car (based on motion sensed by sensor 318), AR or VR representations of digital content entitlements associated with racing content can be presented to the user.

Sensor 318 may include one or more of image sensors, temperature sensors, speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, and/or other sensors. In some implementations, sensor 318 may be worn by a person. In some implementations, sensor 318 may be installed in or otherwise coupled to simulation device 302.

Simulation device 302 may obtain activity information from output signals generated by sensor 318. In some implementations, sensor 318 may include one or more of an image sensor that characterizes an action performed by a user, a sound sensor that characterizes a sound made by a user, a wearable sensor that characterizes an action performed and/or a sound made by a user, and/or other sensors.

Simulation event occurrence component 312 may be configured to identify occurrences of simulation events. A simulation event may refer to one or more specific motions, specific actions, specific sounds, specific locations, specific surroundings, and/or other specific conditions relating to the user. Occurrences of simulation events may be identified based on one or more motion information, activity information, environment information, etc. Simulation event occurrence component 312 may be configured to identify an occurrence of a simulation event when one or more motion information, activity information, etc. indicates the occurrence of one or more specific motions, specific actions, specific sounds, specific locations, specific surroundings, and/or other specific conditions relating to the user that correspond to a specific simulation event.

Criteria for an occurrence of one or more simulation events may be referred to as a simulation event logic. The simulation event logic may be programmed into simulation event occurrence component 312, updated by simulation event occurrence component 312, obtained by simulation event occurrence component 312 from the simulation information, obtained by simulation event occurrence component 312 from memory, obtained by simulation event occurrence component 312 from a remote location, and/or obtained by simulation event occurrence component 312 in other ways.

Simulation stimulation generation component 314 may be configured to generate simulation stimuli that correspond to simulation events for which occurrences are identified. A simulation stimulus may refer to one or more of a visual, an audio, a haptic and/or other simulation that may change a simulation experience. Simulation stimulation generation component 314 may be configured to generate a simulation stimulus for a simulation event when the simulation stimulus corresponding to the simulation event is found in the simulation information.

Simulation provision component 316 may be configured to effectuate provision of a simulated experience by operating simulation device presentation (output) device 220. Presentation (output) device 220 may include one or more of a display, a speaker, a light source, an air conditioner, a heater, a temperature controller and/or other simulation devices. Simulation provision component 316 may be configured to effectuate provision of a simulated experience through one or more visual, audio, haptic and/or other simulation, where the visual, audio, haptic, and/or other simulation changes based on simulation stimuli.

Figure 4A:
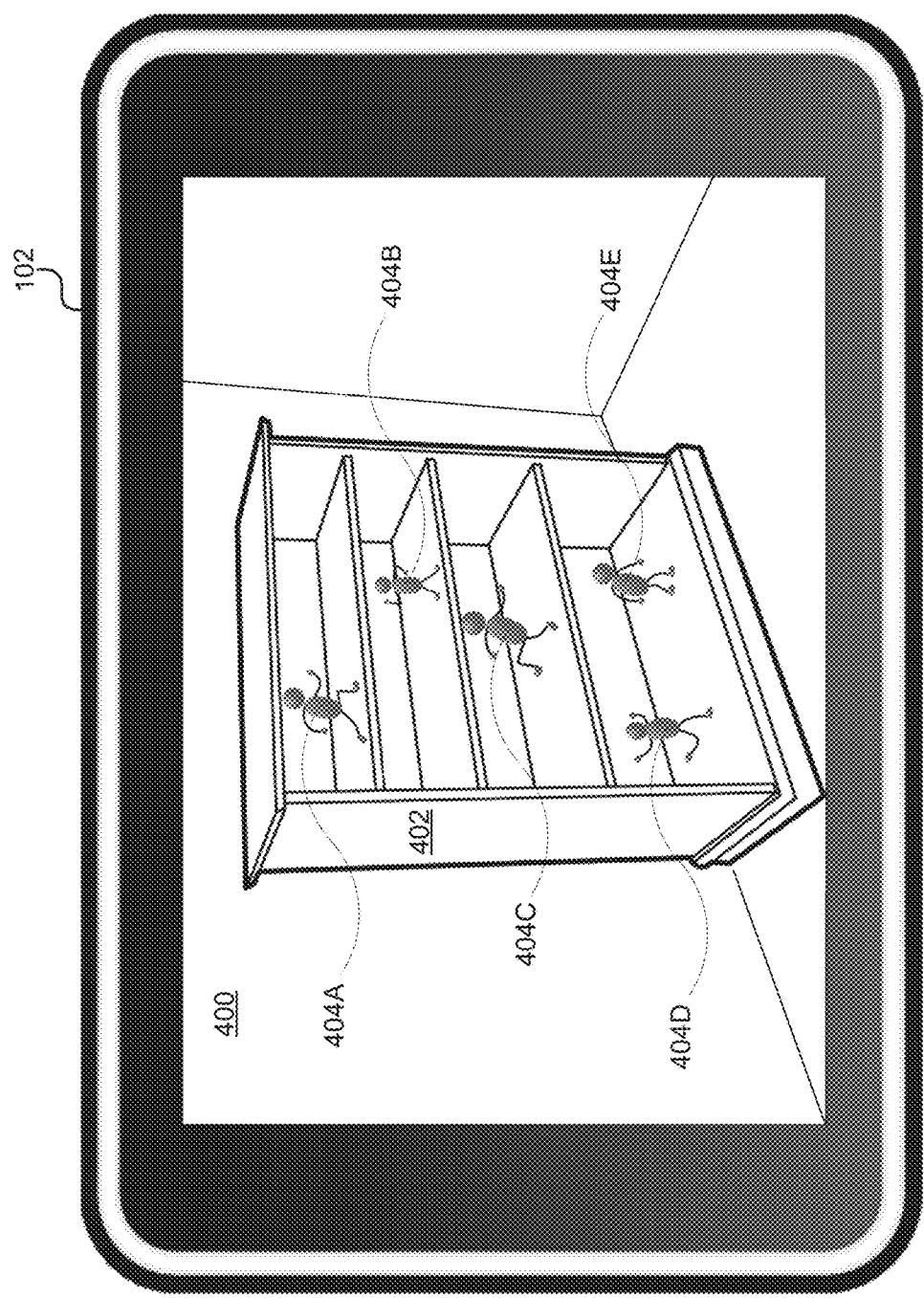
FIGS. 4A, 4B, and 4C illustrate an example AR or VR representation and interaction scenario in accordance with one embodiment.

As alluded to above, a simulated AR or VR experience may refer to a simulated presentation comprising one or more AR or VR representations of digital content entitlements, such as a collection of animated movie characters presented in a simulated bookshelf meant to emulate a physical media content collection. For example, and referring to FIG. 4A, an AR environment or scene 400 is presented on a display of a tablet PC 102 in response to a user executing an AR application resident on tablet PC 102 and pointing the camera of tablet PC 102 to an actual bookshelf 402. As shown in FIG. 4A, AR representations of digital content entitlements are presented in the form of animated characters 404A-404E in bookshelf 402. One or more animated characters 404A-404E can represent digital movies, books, music, etc. that the user owns.

To achieve the above experience, simulation experience component 308 may determine, based upon a user's entitlements and based upon the physical presence of bookshelf 402 (obtained from simulation information component 310 and/or sensor 318), that animated characters 404A-404E are to be presented on bookshelf 402.

Figure 4B:
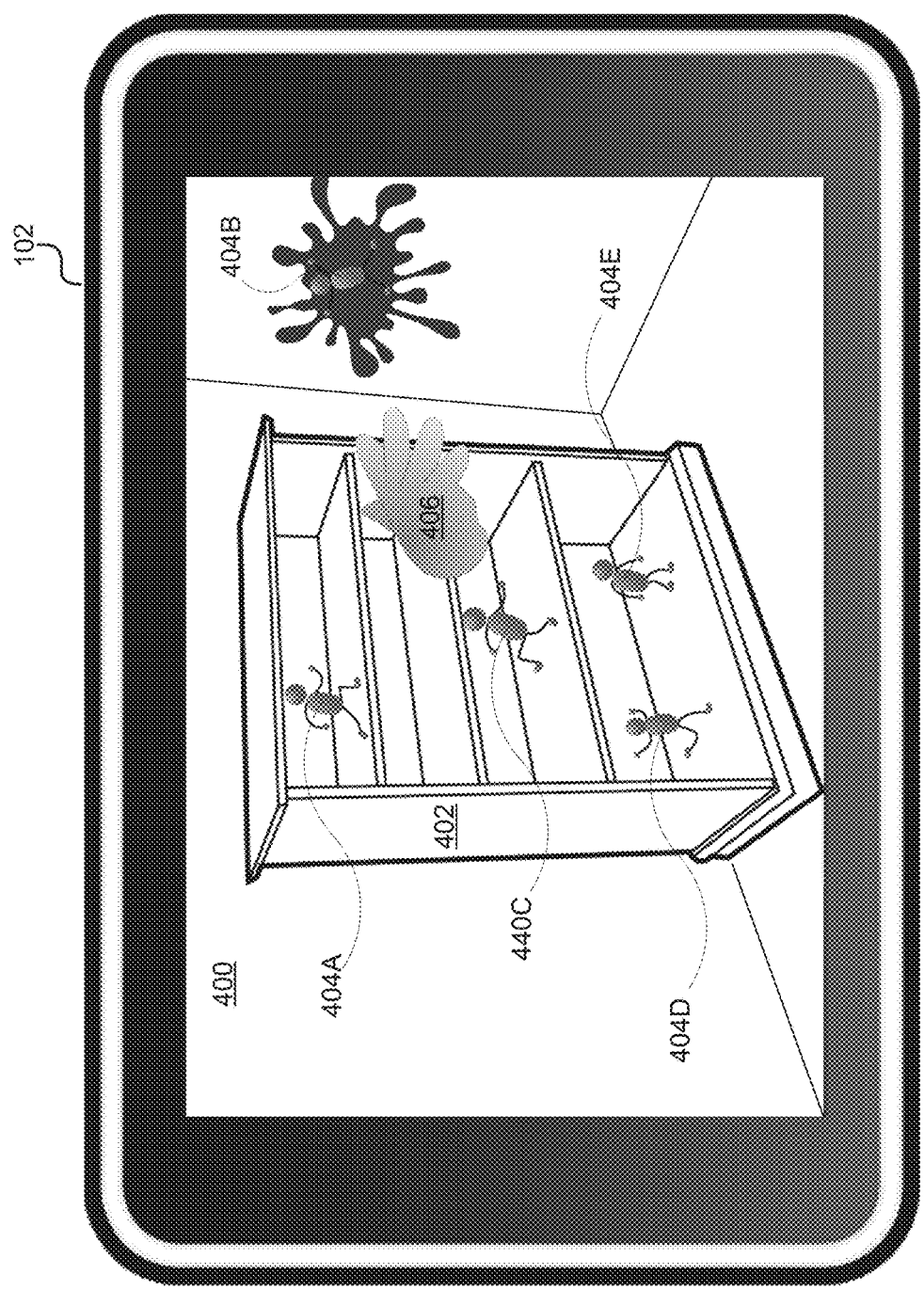

In order to present or consume the digital content associated with a particular digital content entitlement, the user can perform some interaction with the AR or VR representation. For example, and referring to FIG. 4B, a user may pick up an AR representation, such as animated character 404B, with an AR or VR representation of the user's hand 406, and throw the animated character 404B against a wall. In other embodiments, the user may "high-five" one of animated characters 404A-404E, dance with one of animated characters 404A-404E, etc. In some embodiments, this interaction may be presented as a game, where the user is left to figure out how to interact with/what interaction(s) can prompt the presentation of digital content. In some embodiments, instructions for the interaction could be displayed on a sign near the AR representation.

Figure 4C:
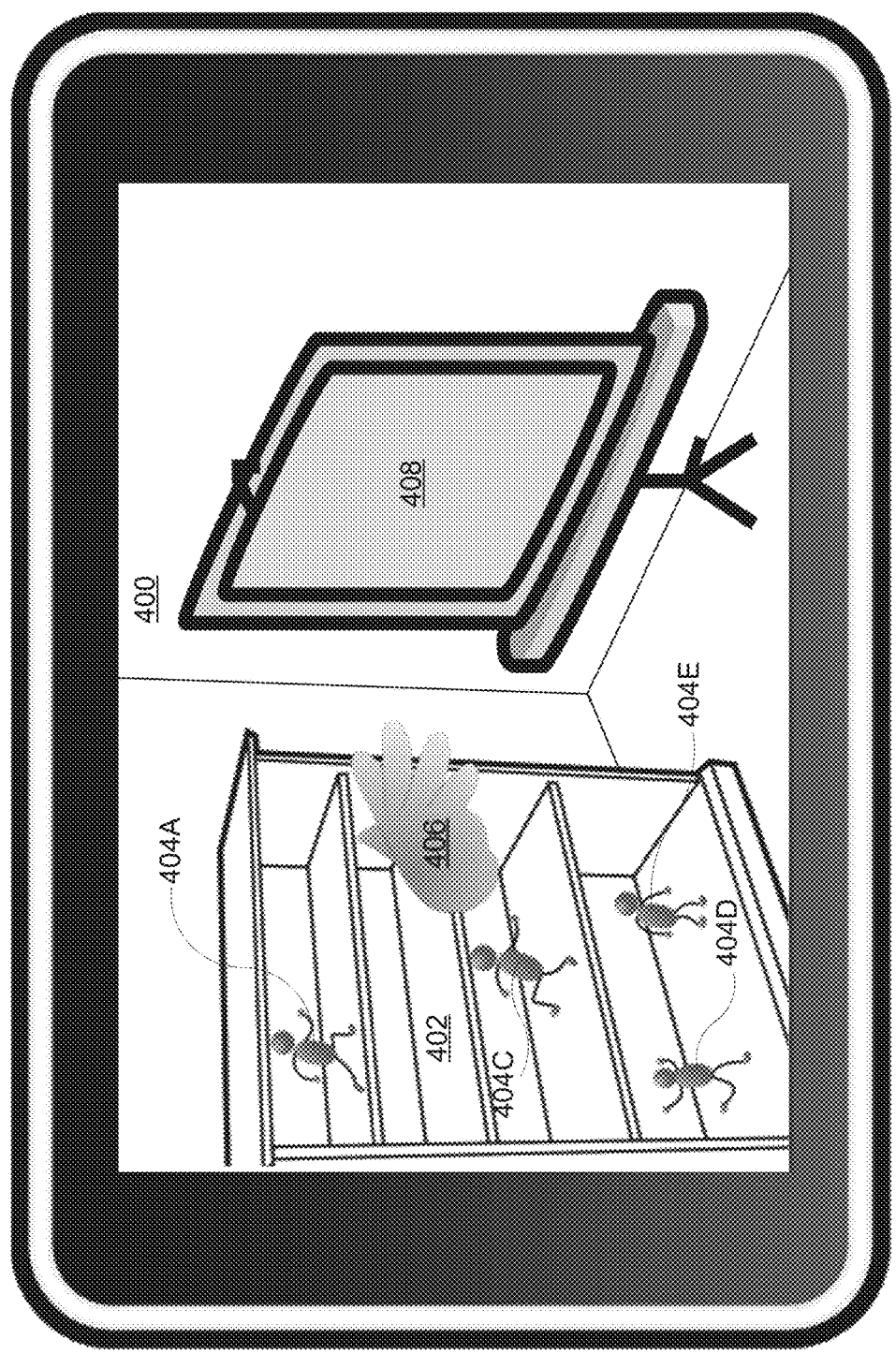

As illustrated in FIG. 4C, the action of throwing animated character 404B against the wall results in a movie screen 408 appearing, on which the associated digital content is presented. Various methods of presenting the digital content are contemplated in accordance with various embodiments, such as replacing the AR or VR environment or scene, e.g., AR scene 400, with a media presentation screen or application.

That is, simulation event occurrence component 312 can sense the movement(s) of the user's hand and translate the movement(s) into an indication of a particular type of interaction with animated character 404B (e.g., picking up and throwing animated character 404B). Simulation event occurrence component 312 can interact with simulation information component 310 and/or sensor 318 to determine which of animated characters 404A-404E (in this case, animated character 404B) the user's hand is near or assumed to be interacting with. Simulation stimuli generation component 314 may provide visual, audio, and/or haptic feedback, such as a visual representation of animated character 404B "going splat" against the wall, a corresponding "splat" sound and "splat" vibration. Further still, simulation provision component 316 initiates playback of the digital content corresponding to animated character 404B through presentation (output) device 322.

It should be noted that the AR or VR experience can be shared between the user and "guest" users to allow others to enter an AR or VR experience representative of the user's digital content collection. This can be done to allow the guest users to see the digital content available to the user, for example. These guest users can be allowed to interact with the AR or VR representations of digital content entitlements, which they may not have, and be presented with transactional opportunities for that digital content.

In some embodiments, the AR or VR representations of digital content entitlements can differ depending upon how the user acquired the digital content. For example, if the user purchased an entitlement to the digital content on the first date of its release, an animated character representative of the digital content entitlement may have a particular outfit, thereby encouraging collectability and/or competition.

In some embodiments, creating an AR or VR representation of digital content entitlements allows for a persistent digital world in which digital gifts and/or bonus content can be provided with the purchase of an entitlement, and in which those digital gifts and/or bonus content can reside. For example, the purchase of a particular toy associated with a movie can unlock a mini-game interaction with the AR or VR representation of the movie, or a group of additional AR or VR representations can appear with the original AR or VR representation.

Figure 5A:
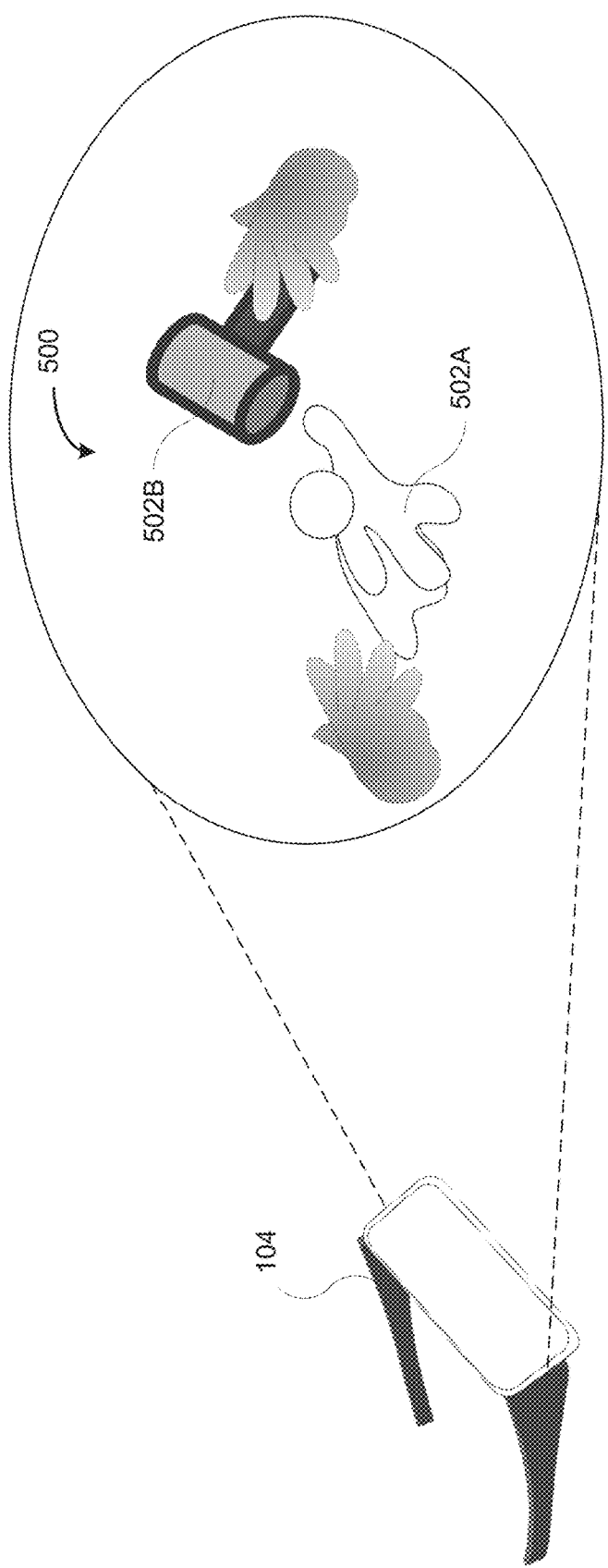
FIGS. 5A and 5B illustrate an example AR or VR representation and interaction scenario in accordance with one embodiment.
Figure 5B:
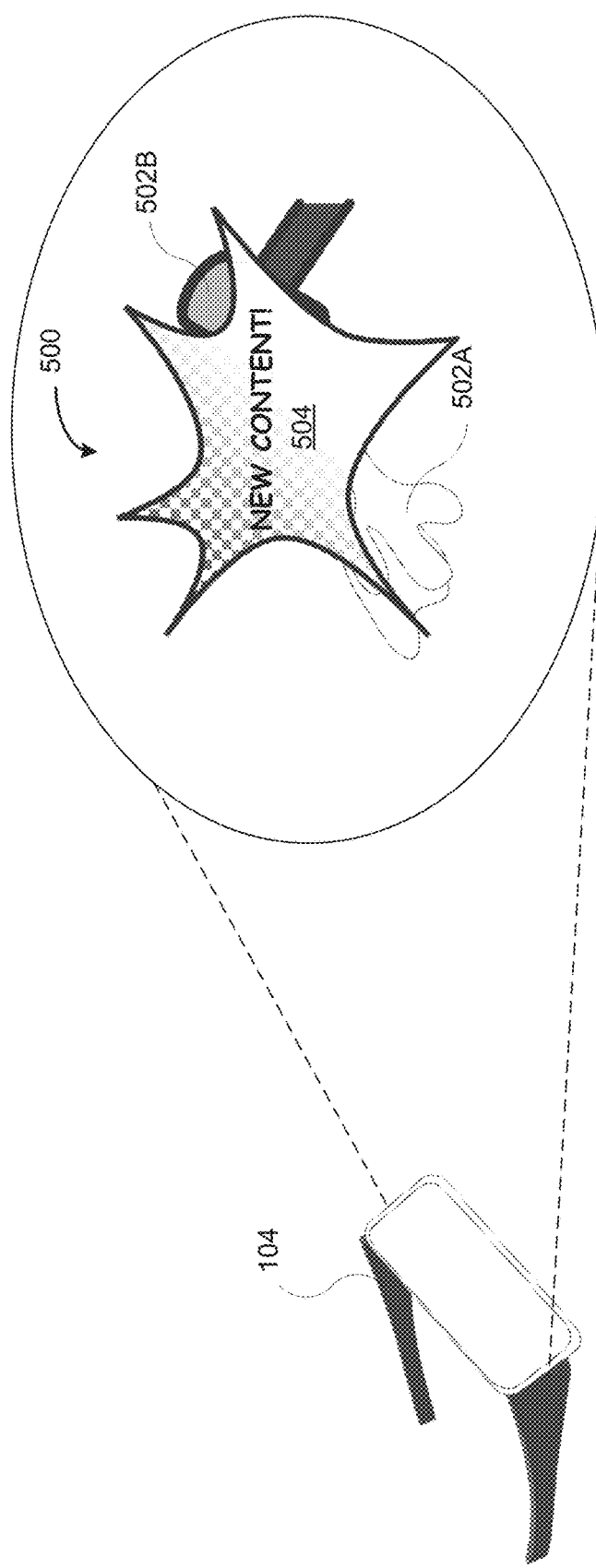

Further still, some embodiments allow for the interaction of AR representations of physical objects that represent digital content entitlements. For example, as illustrated in FIG. 5A, when viewed through user device 104, toys associated with certain movies, digital content versions of which were purchased with or separately from the purchase of the toys, can be presented as AR representations. That is, a first digital content entitlement associated with a first super-hero movie can be presented as an AR representation of a physical super-hero action FIG. 502A. Likewise, a second digital content entitlement associated with a second superhero movie can be presented as an AR representation of a physical super-hero weapon 502B. As illustrated in FIG. 5B, and upon the user of user device 104 interacting with both action FIG. 502A and weapon 502B (in this case, "smashing" them together), new, alternative, or bonus content 504 can be discovered.

Figure 6:
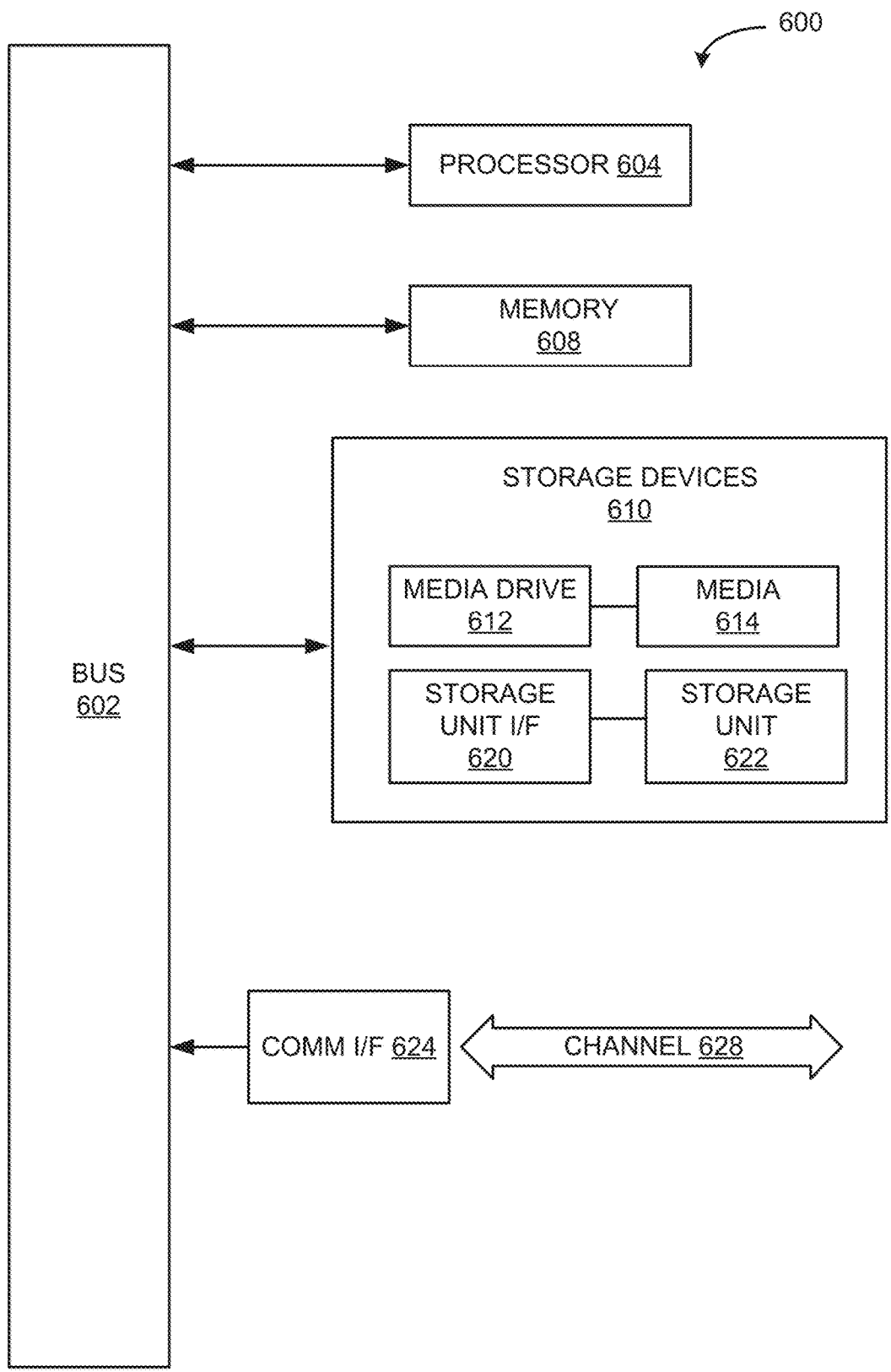
FIG. 6 is an example computing component that may be used to implement various features of embodiments described in the present disclosure.

FIG. 6 illustrates an example computing component that may be used to implement various features of the system and methods disclosed herein, for example, one or more elements of system 100 and/or 300, such as user devices 102, 104, and 106, simulation device 302, and presentation (output) device 322.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example navigation systems, portable computing devices, and other electronic devices that might include some form of processing capability.

Computing component 600 might include, for example, one or more processors, controllers, control components, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing component 600 or to communicate externally.

Computing component 600 might also include one or more memory components, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 614 might include, for example, a hard disk, an integrated circuit assembly, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot, a PCMCIA slot and card, and other fixed or removable storage units 622 and interfaces 620 that allow software and data to be transferred from the storage unit 622 to computing component 600.

Computing component 600 might also include a communications interface 624. Communications interface 624 might be used to allow software and data to be transferred between computing component 600 and external devices.

Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   presenting to a user an augmented reality (AR) or virtual reality (VR) representation of one or more digital content entitlements in accordance with a visual theme representative of the one or more digital content entitlements;
   receiving interactive input regarding the AR or VR representation of the one or more digital content entitlements;
   invoking one or more actions related to digital content associated with the one or more digital content entitlements based upon the interactive input; and
   adjusting the visual theme to comport with a viewing history of the user related to the digital content associated with the one or more digital content entitlements.

2. The computer-implemented method of claim 1, wherein the AR or VR representation comprises at least one of a character, object, and word art associated with the digital content.

3. The computer-implemented method of claim 1, wherein the presentation of the AR or VR representation comprises presenting a simulated collection of the digital content associated with the one or more digital content entitlements.

4. The computer-implemented method of claim 1, further comprising generating, in accordance with the visual theme, a thematic environment in which the AR or VR representation is presented based upon one or more characteristics of the digital content or historical information indicative of consumption of the digital content associated with the one or more digital content entitlements or additional digital content.

5. The computer-implemented method of claim 1, wherein the AR or VR representation is based upon a physical real-world object associated with the digital content.

6. The computer-implemented method of claim 1, wherein the interactive input comprises input resulting from interaction between the user and the AR or VR representation.

7. The computer-implemented method of claim 6, wherein the user comprises one of an owner of the one or more digital content entitlements or a guest user that does not own one or more of the one or more digital content entitlements.

8. The computer-implemented method of claim 1, wherein the interactive input determines a type of the one or more actions invoked.

9. The computer-implemented method of claim 1, wherein the one or more actions comprises at least one of presentation of the digital content, presentation of an option to purchase a corresponding digital content entitlement, presentation of additional content associated with the digital content, presentation of a digital gift associated with the digital content.

10. The computer-implemented method of claim 1, further comprising presenting specialized content associated with at least one of two or more digital contents upon receiving interactive input regarding two or more AR or VR representations of digital content entitlements associated with the two or more digital contents.

11. The computer-implemented method of claim 10, wherein the interactive input comprises an interaction initiated by the user between the two or more AR or VR representations.

12. The computer-implemented method of claim 1, wherein the presentation of the AR or VR representation, the receipt of the interactive input, and the invocation of the one or more actions is performed by an AR or VR system comprising at least one of a simulation device, a sensor, and a presentation device.

13. An apparatus, comprising:
a simulation device adapted to create an AR or VR representation for each digital content entitlement to digital content owned by a user;
at least one sensor adapted to at least one of receive and provide motion information associated with the user interacting with one or more of the AR or VR representations; and
a presentation device adapted to present an AR or VR environment in which the AR or VR representations as a collection representative of the digital content owned by the user, the AR or VR environment comporting with a visual theme representative of the one or more digital content entitlements;
wherein the presentation device is further adapted to adjust the visual theme to comport with a viewing history of the user related to the digital content associated with the one or more digital content entitlements.

14. The apparatus of claim 13, wherein the AR or VR representation for each digital content entitlement owned by the user comprises at least one of a character, object, and word art associated with the digital content.

15. The apparatus of claim 13, wherein the simulation device generates the visual theme by generating a static or dynamic thematic AR or VR environment based upon one or more characteristics of the digital content or historical information indicative of consumption of the digital content owned by the user or additional digital content not owned by the user.

16. The apparatus of claim 13, wherein the at least one sensor is further adapted to recognize a real-world physical object associated with the digital content, and wherein the AR or VR representation for the corresponding digital content entitlement is based upon the real-world physical object.

17. The apparatus of claim 13, wherein the at least one sensor is further adapted to at least one of receive and provide motion information associated with a guest user interacting with the one or more AR or VR representations.

18. The apparatus of claim 17, wherein the presentation device is further adapted to present an option to purchase a corresponding digital content entitlement based upon the guest user interacting with the one or more AR or VR representations.

19. The apparatus of claim 13, wherein the presentation device is further adapted to at least one of present the digital content associated with the AR or VR representation with which the user interacts, present additional content related to the digital content associated with the AR or VR representation with which the user interacts, and present an option to engage in a purchase transaction involving a product related to the digital content associated with the AR or VR representation with which the user interacts.

20. The apparatus of claim 13, wherein the presentation device is further adapted to present specialized content related to two or more digital contents associated with two or more AR or VR representations with which the user interacts simultaneously.

* * * * *